United States Patent
Bigo et al.

[11] Patent Number: 6,160,650
[45] Date of Patent: Dec. 12, 2000

[54] OPTICAL REGENERATION FOR WAVELENGTH-DIVISION MULTIPLEX SOLITON SIGNAL FIBER OPTIC TRANSMISSION SYSTEMS

[75] Inventors: Sébastien Bigo, Palaiseau; Olivier Leclerc, Saint Michael sur Orge, both of France

[73] Assignee: Alcatel, Paris, France

[21] Appl. No.: 09/024,106

[22] Filed: Feb. 17, 1998

[30] Foreign Application Priority Data

Feb. 18, 1997 [FR] France .................. 97 01901

[51] Int. Cl.⁷ .......................... H04B 10/00; H04B 10/12; H04B 10/16; H04B 10/18
[52] U.S. Cl. .......................... 359/124; 359/174; 359/176; 359/177
[58] Field of Search ................... 359/124, 125, 359/126, 132, 133, 134, 173, 161, 158, 174, 176, 177

[56] References Cited

U.S. PATENT DOCUMENTS

| | | | |
|---|---|---|---|
| 5,786,918 | 7/1998 | Suzuki et al. | 359/135 |
| 5,801,862 | 9/1998 | Desurvire et al. | 359/124 |
| 5,857,040 | 1/1999 | Bigo | 385/15 |
| 5,911,015 | 6/1999 | Bigo | 385/1 |

Primary Examiner—Leslie Pascal
Assistant Examiner—Agustin Bello
Attorney, Agent, or Firm—Sughrue, Mion, Zinn, Macpeak & Seas, PLLC

[57] ABSTRACT

In a wavelength-division multiplex fiber optic soliton signal transmission system the wavelengths of the multiplex are chosen to assure a relative slippage between the channels at a given interval substantially equal to a multiple of the bit time. At one point of the transmission system at least, the soliton pulses of the various channels have a temporal offset relative to a given reference such that, on distributed optical modulation by a clock that is input at this point, for each channel, the extremum of the non-linear phase profile induced by the clock, integrated over the modulation length, coincides with the center of the bit time. In a system of this kind distributed optical modulation can be applied to all the channels of the multiplex by a single sinusoidal signal. The modulation can be effected in a non-linear optical loop mirror or in the transmission fiber itself.

18 Claims, 2 Drawing Sheets

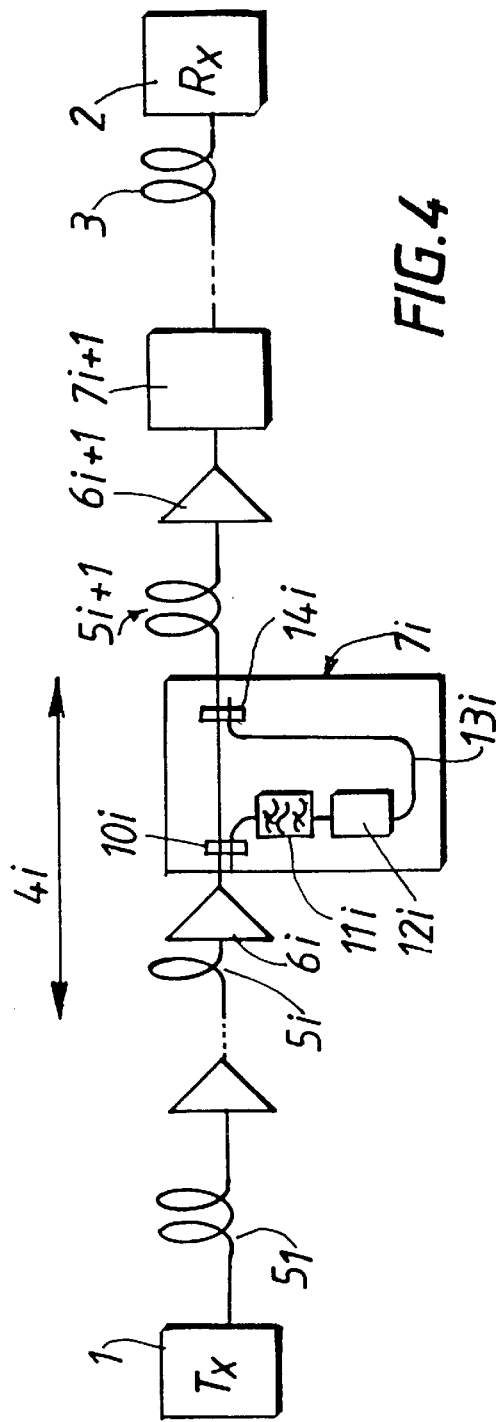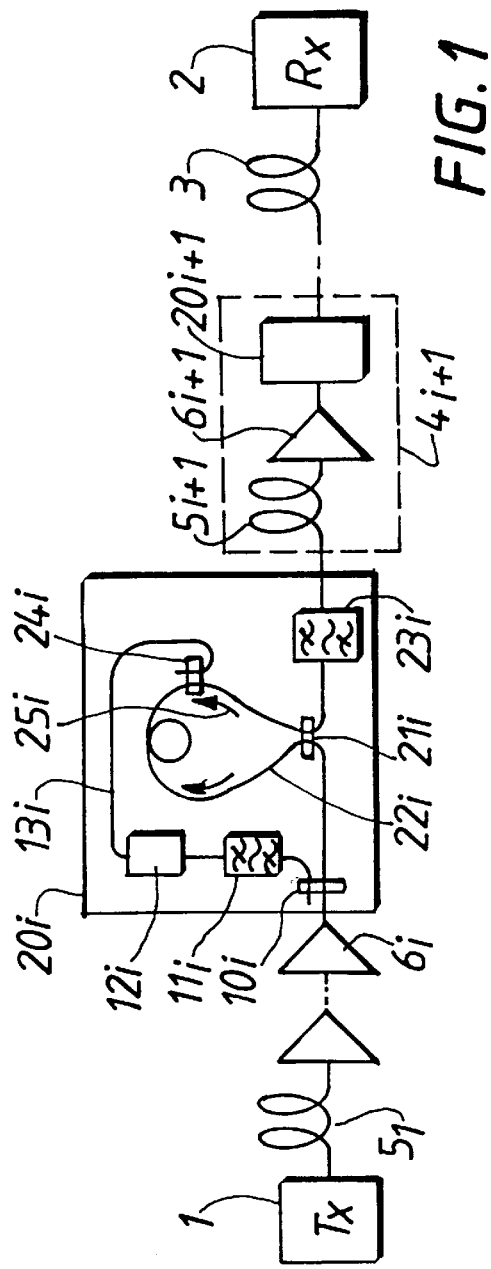
FIG. 4
FIG. 1

6,160,650

OPTICAL REGENERATION FOR WAVELENGTH-DIVISION MULTIPLEX SOLITON SIGNAL FIBER OPTIC TRANSMISSION SYSTEMS

BACKGROUND OF THE INVENTION

1. Field of the Invention

The present invention concerns a wavelength-division multiplex soliton signal fiber optic transmission system in which the various wavelengths of the multiplex are chosen to assure, over a given interval, relative slippage between the various channels substantially equal to a multiple of the bit time. It also concerns a method of transmission in a system of this kind.

2. Description of the Prior Art

Transmitting soliton pulses, or solitons, in the abnormal dispersion part of an optical fiber is a phenomenon known in itself. Solitons are pulse signals of $sech^2$ shape. With this pulse shape the non-linearity in the corresponding part of the fiber compensates the dispersion of the optical signal. The transmission of solitons is modeled in a manner known in itself by the non-linear Schrödinger equation.

Various effects limit the transmission of such pulses, such as the jitter induced by the interaction of the solitons with noise present in the transmission system, as described for example in the article by J. P. Gordon and H. A. Haus, Optical Letters, vol. 11 No. 10 pages 665–667. This effect, known as the Gordon-Haus effect, imposes a theoretical limit on soliton transmission quality or bit rate.

Synchronous modulation of soliton signals by means of semiconductor modulators can be used to exceed this limit. This technique intrinsically limits the bit rate of the soliton link because of the upper limit of the pass-band of the semiconductor modulators. Sliding-frequency guiding filter systems controlling the jitter of the transmitted solitons have also been proposed, for example in EP-A-0 576 208.

Using the Kerr effect in synchronous amplitude or phase modulators to regenerate the signal on the line has also been proposed. These techniques necessitate high-frequency components, whence the benefit of an all-optical approach. A non-linear optical loop mirror (NOLM) can be used for the amplitude modulation and the fiber itself for the phase modulation. A presentation by S. Bigo, P. Brindel and O. Leclerc to the "Journees nationales de l'Optique guidée", Oct. 30, 1996, Nice (France), described regeneration of a soliton signal by all-optical phase modulation. An optical clock is superposed on the soliton signal which imposes a non-linear phase-shift on the pulses of the soliton signal, copropagating with them in an optical fiber. A section of the fiber is selected to minimize the effects of slippage between the soliton signal and the optical clock. Reference may usefully be had to T. Widdowson et al, Soliton shepherding all optical active soliton control over global distances, IEE Electron. Letters, vol. 30 No. 12 p. 990 (1994).

Using wavelength-division multiplexing to increase the bit rate of soliton signal fiber optic transmission systems has also been proposed. In this case it is considered advantageous to use Fabry Perot type sliding-frequency guiding filters which are entirely compatible with wavelength-division multiplexed signals. On the other hand, problems can occur if synchronous modulators are used to regenerate wavelength-division multiplexed soliton signals because of the group velocity difference between the signals on the various channels.

An article by E. Desurvire, 0. Leclerc and O. Audouin, Optics Letters, vol. 21, No. 14 describes a wavelength allocation scheme compatible with the use of synchronous modulators. The article proposes to allocate wavelengths to the various channels of the multiplex so that, for given distances between repeaters, the signals of the various channels are synchronized on reaching the repeaters. This enables in-line synchronous modulation of all channels, at given intervals, by means of discrete modulators. The article specifies a maximal value of $5.10^{-3}$ for the relative variation in position of the repeaters, which assures that the relative variation in the bit time remains below 5% for five channels. This technique cannot be applied directly to all-optical modulators utilizing the Kerr effect or to distributed modulators because the dispersion in the fiber causes slippage between the various channels and the clock assuring the modulation.

In a dissertation entitled *Traitement de signal tout-optique pour la transmission à trés haut débit de solitons par fibre optique* (University of Besancon, 1996) S. Bigo has shown that an all-optical modulator utilizing the Kerr effect, such as an NOLM or a fiber, can be considered as a discrete sinusoidal modulator synchronized with the stream of solitons, despite the slippage ("walkoff") due to chromatic dispersion and losses, if the clock is sinusoidal and the temporal offset between the signal to be modulated and the clock is adjusted.

The present invention proposes an original and simple solution to the problem of all-optical modulation of wavelength-division multiplexed soliton signals. It enables existing solutions (amplitude of phase distributed optical modulation) to be applied to wavelength-division multiplexed soliton signals despite the slippage caused by group velocity differences.

SUMMARY OF THE INVENTION

The invention consists in a wavelength-division multiplex fiber optic soliton signal transmission system in which the wavelengths of said multiplex are chosen to assure a relative slippage between the various channels at a given interval substantially equal to a multiple of the bit time and, at one point of said transmission system at least, the soliton pulses of the various channels have a temporal offset relative to a given reference such that, on distributed optical modulation by a clock that is input at the aforementioned point, for each channel, the extremum of the non-linear phase profile induced by the clock, integrated over the modulation length, coincides with the center of the bit time.

In one embodiment, for any wavelength $\lambda_i$ of the multiplex, the difference $\delta\tau_i$ between the slippage per unit length on the channel i and on the first channel satisfies the equation:

$$(k_i T - T/4) < \delta\tau_i Z_R < (k_i T + T/4)$$

where $k_i$ is an integer dependent on the channel and T is the bit time.

At least two distributed optical modulator devices can be provided along the transmission system and separated by a distance that is a multiple of the aforementioned interval.

In one embodiment the optical modulator device comprises:

means for filtering some of the signals, means for recovering a sinusoidal clock from the filtered signal, and means for coupling the clock into the fiber.

In this case the temporal offset $\Delta_i$ for each channel i can be given by the equation:

$$\Delta_i = \frac{-1}{2\pi B}\left\{\arctan\left[\frac{\sin(2\pi B\tau_i)}{\cos(2\pi B\tau_i)-1/\Gamma}\right]-\arctan\left[\frac{2\pi B\tau_i}{\text{Ln}(\Gamma)}\right]\right\}$$

in which $\Gamma$ represents the total loss in the fiber over the length of the interval $Z_R$ and $\tau_i$ represents the relative slippage between the channel i and the clock over the interval $Z_R$ normalized by the bit rate B.

The optical modulator device can also include:

means for filtering some of the channels, means for recovering a sinusoidal clock from the filtered signal, a non-linear optical loop mirror into which the soliton signals of the various channels pass, and means for coupling the clock into the non-linear optical loop mirror.

In this case the temporal offset $\Delta_i$ for each channel i is advantageously given by the equation:

$$\Delta_i = \frac{-1}{\pi B}\left\{\arctan\left[\frac{\sin(\pi B\tau_i)}{\cos(\pi B\tau_i)-1/\Gamma}\right]-\arctan\left[\frac{\pi B\tau_i}{\text{Ln}(\Gamma)}\right]\right\}$$

in which $\Gamma$ represents the total loss in the fiber of the mirror and $\tau_i$ represents the relative slippage between the channel i and the clock in said mirror normalized by the bit rate B.

The system preferably includes at least one filter having a transfer function adapted to compensate relative attenuation of the channels caused by modulation in the optical modulator device.

In the case of the NOLM, each filter can be disposed at the output of a non-linear optical loop mirror and additionally separates the soliton signals and the clock.

The system can also include at least one guiding filter.

The invention also proposes a transmission method in a wavelength-division multiplex fiber optic soliton signal system wherein the wavelengths of the multiplex are chosen to assure a relative slippage between the channels at a given interval substantially equal to a multiple of the bit time, the soliton pulses of the various channels being transmitted so that at one point at least of the transmission system they have a temporal offset relative to a given reference such that on distributed optical modulation by a clock that is input at the aforementioned point, for each channel, the extremum of the non-linear phase profile induced by the clock, integrated over the modulation length, coincides with the center of the bit time.

In one embodiment, for any wavelength $\lambda_i$ of the multiplex the difference $\delta\tau_i$ between the slippage per unit length on the channel i and on the first channel satisfies the equation:

$(k_i \cdot T - T/4) < \delta\tau_i \cdot Z_R < (k_i \cdot T + T/4)$ in which $k_i$ is an integer dependent on the channel.

At least one distributed optical modulation step is advantageously executed at a distance from the aforementioned point that is a multiple of the aforementioned interval.

The optical modulation step can include distributed optical modulation in a non-linear optical loop mirror or in the transmission fiber by means of a sinusoidal clock.

In the case of optical modulation in the transmission fiber, the temporal offset $\Delta_i$ for each channel i is given, for example, by the equation:

$$\Delta_i = \frac{-1}{2\pi B}\left\{\arctan\left[\frac{\sin(2\pi B\tau_i)}{\cos(2\pi B\tau_i)-1/\Gamma}\right]-\arctan\left[\frac{2\pi B\tau_i}{\text{Ln}(\Gamma)}\right]\right\}$$

in which $\Gamma$ represents the total loss in the fiber over the length of the interval $Z_R$ and $\tau_i$ represents the relative slippage between the channel i and the clock over the interval $Z_R$ normalized by the bit rate B.

In the case of distributed optical modulation by a non-linear optical loop mirror, the temporal offset $\Delta_i$ for each channel i is advantageously given by the equation:

$$\Delta_i = \frac{-1}{\pi B}\left\{\arctan\left[\frac{\sin(\pi B\tau_i)}{\cos(\pi B\tau_i)-1/\Gamma}\right]-\arctan\left[\frac{\pi B\tau_i}{\text{Ln}(\Gamma)}\right]\right\}$$

in which $\Gamma$ represents the total loss in the fiber of the mirror and $\tau_i$ represents the relative slippage between the channel i and the clock in the mirror normalized by the bit rate B.

At least one step of filtering the signal by a filter having a transfer function compensating relative attenuation of the channels caused by the modulation step can be executed.

Other features and advantages of the invention will become apparent from a reading of the following description of embodiments of the invention given by way of example and with reference to the appended drawings.

BRIEF DESCRIPTION OF THE DRAWINGS

FIG. 1 is a schematic representation of a first embodiment of a transmission system in accordance with the invention.

FIG. 4 is a schematic representation of a second embodiment of a transmission system in accordance with the invention.

DETAILED DESCRIPTION OF THE PREFERRED EMBODIMENTS

Figure 2:
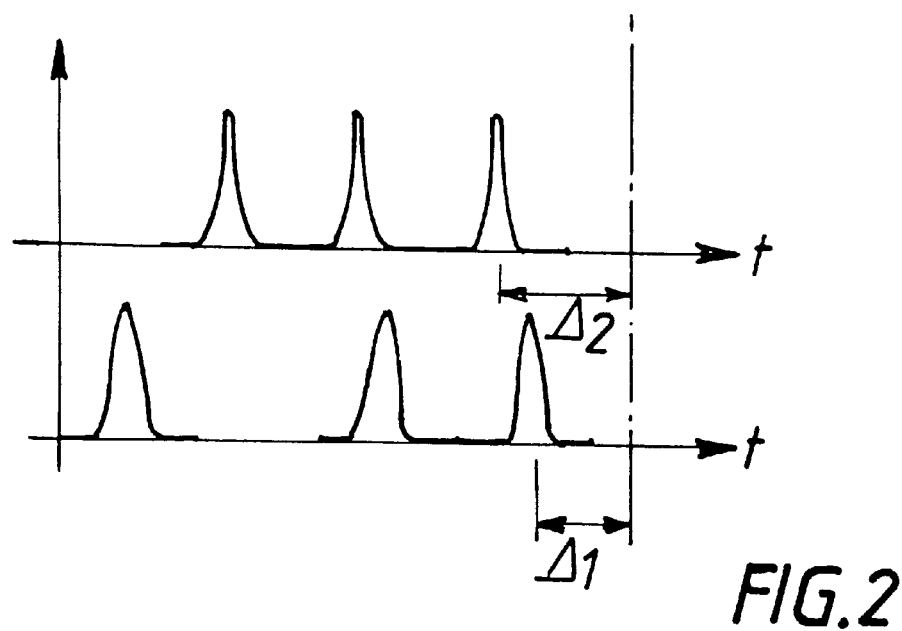
FIG. 2 shows signals on two channels of the system from FIG. 1 at the transmitting end.

For implementing the invention a wavelength allocation scheme has been adopted assuring, at regular interval $Z_R$ along the fiber, a relative slippage between the various channels substantially equal to a multiple of the bit time. This can be expressed as follows, for each channel:

$(k_i \cdot T - T/4) < \delta\tau_i \cdot Z_R < (k_i \cdot T + T/4)$ where T is the bit time, $k_i$ is an integer dependent on the channel and $\delta\tau_i$ is the slippage of the channel i relative to channel 1. This equation reflects the fact that at the interval ZR the offsets between the various channels caused by the slippage are integer multiples of the bit time, to within one quarter of a bit time. The bit times are therefore exactly or virtually exactly coincident with an interval $Z_R$ in that the bit times coincide exactly or virtually exactly on transmission.

The wavelength allocation scheme described in the article by E. Desurvire et al mentioned above can be used, to which disclosure reference should be had for more information on this subject. Of course, other wavelength allocation schemes are feasible.

The invention proposes to associate a frequency allocation scheme of the above kind with a set of phase-shifts or temporal offsets between the soliton signals on the various channels of a wavelength-division multiplex soliton signal fiber optical transmission system. An appropriate choice of these phase-shifts or temporal offsets enables distributed modulation of the soliton pulses on all the channels by a single sinusoidal clock; this choice of phase-shift or offsets is reproduced at regular intervals along the fiber, the interval being that of the wavelength allocation scheme. Distributed optical modulation of the various channels of the wavelength-division multiplex signal can then be effected at each or at some of the regular intervals.

The relative offset of the various channels is chosen so that the extremuin of the non-linear phase profile induced by the clock, when integrated over all of the modulation length, coincides with the center of the bit time for each of the various channels of the wavelength-division multiplex. This assures that each of the channels can be modulated by a single sinusoidal clock signal independently of the slippage between the clock and the signals on the various channels.

A possible value for the temporal offsets to assure this coincidence is given by the following equation in the case of distributed optical modulation in a Kerr fiber:

$$\Delta_i = \frac{-1}{2\pi B}\left\{\arctan\left[\frac{\sin(2\pi B \tau_i)}{\cos(2\pi B \tau_i) - 1/\Gamma}\right] - \arctan\left[\frac{2\pi B \tau_i}{\text{Ln}(\Gamma)}\right]\right\}$$

in which $\Delta_i$ represents the offset of the channel i relative to a given reference, B represents the bit rate, $\Gamma$ the total loss in the fiber over the length of the interval $Z_R$ and $\tau_i$ represents the relative slippage between the channel i and the clock over the interval $Z_R$ normalized by the bit rate.

For an NOLM the possible value of the temporal offsets is given by the same equation, but in this case B represents half the bit rate, $\Gamma$ the loss in the NOLM fiber and $\tau_i$ the relative slippage between the channel i and the clock in the NOLM normalized by the bit rate.

Applying phase-shifts or temporal offsets of the above kind on transmission enables distributed optical modulation of all the channels by a sinusoidal signal, which has exactly the same effect as a discrete semiconductor modulator. If a channel wavelength allocation scheme is chosen that assures exact or virtually exact coincidence of the bit times periodically along the transmission fiber distributed optical modulation can be applied periodically, at each or at some of the intervals $Z_R$. The various channels, or to be more precise the bit times of the various channels, have the same temporal offset at each interval $Z_R$.

FIG. 1 shows a first embodiment of the invention in which distributed optical modulation in the transmission fiber uses the Kerr effect. The FIG. 1 transmission system includes a transmitter Tx 1 and a receiver Rx 2 connected to a section of fiber 3 and n sections $4_i$ (i=1 through n). The transmitter 1 transmits soliton pulses to the first section i=1 on different channels of a wavelength-division multiplex at wavelengths $\lambda_1$ through $\lambda_n$. The various wavelengths are chosen in accordance with a frequency allocation scheme assuring a relative slippage between the various channels that is substantially equal to a multiple of the bit time for a given interval $Z_R$. The last section i=n is connected to the fiber 3 that transmits the soliton pulses to the receiver 3.

Each section $4_i$ comprises a length of fiber $5_i$ the exit end of which is connected to an amplifier $6_i$. The output of the amplifier constitutes the input of the optical modulator device $7_i$. The output of the latter is connected to the fiber $5_{i+1}$ of the next section, or to the fiber 3 in the case of the section n. The length of a section preferably corresponds to the interval $Z_R$ so that modulation can be applied at the end of each section if necessary.

The structure of the optical modulator device $7_i$ will now be described in more detail. In the FIG. 1 embodiment the modulation is distributed optical modulation in the transmission fiber by the Kerr effect. The output of the amplifier is connected direct to the fiber $5_{i+1}$ of the next section. The device comprises means for filtering some channels, typically a coupler $10_i$, sampling a portion of the signal from the fiber at the output $5_{i+1}$ of the amplifier; the sampled signal is fed to a filter $11_i$ which isolates one channel, for example the first channel.

The signal from channel 1 filtered in this way is fed to means for recovering a clock $12_i$ which supply a clock signal at the output on a fiber $13_i$, at the bit frequency and offset relative to the soliton signal of the first channel by an amount $\Delta_1$. The clock signal of the fiber $13_i$ is coupled to the fiber $5_{i+1}$ by a coupler $14_i$ and modulates the soliton signals of the various channels of the multiplex. The clock recovery device can be implemented in any manner known to the skilled person.

As explained above it is possible to provide a modulator device at each interval $Z_R$, i.e. for each section in the FIG. 1 situation. Clearly this is not mandatory. The relative position of the amplifier $6_i$ and of the modulator device can also be varied, as will be evident to the skilled person. The number of amplifiers can also be varied, i.e. there need not be an amplifier in each section and there can be more than one per section.

Figure 3:
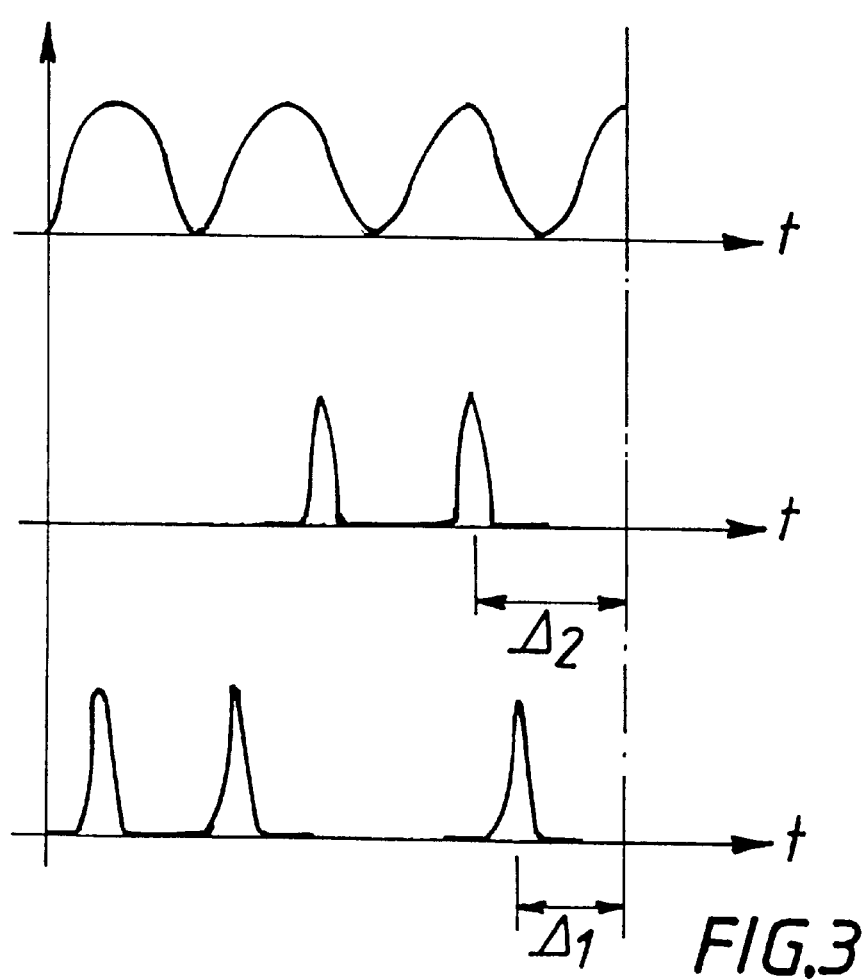
FIG. 3 shows the clock used for modulation and signals on two channels of the system from FIG. 1 at a modulator device.

FIG. 2 is a diagram showing the various soliton signals on channels 1 and 2 at the transmitting end. As explained above, these two signals have respective offsets $\Delta_1$, $\Delta_2$ relative to a temporal reference shown in dashed line in the figure. FIG. 3 is a diagram showing the clock and the various soliton signals on the channels 1 and 2 at the repeater i. Where the signals on channels 1 and 2 are concerned, FIG. 3 is analogous to FIG. 2, because of the wavelength allocation scheme chosen, given that this is assured by a relative offset of the bit times between the channels The clock is a sinusoidal signal at the bit frequency centered on the temporal reference.

FIG. 4 shows a second embodiment of the invention in which an NOLM is used for the distributed optical modulation. FIG. 4 includes the same components 1, 2, 3, $4_i$, $5_i$ and $6_i$ as FIG. 1. However, the modulator device $20_i$ comprises an NOLM. The output of the amplifier is connected to the optical coupler $21_i$ at the input of a fiber optic NOLM $22_i$. The coupler $21_i$ has a coupling ratio $\eta/1-\eta$. The soliton signal is coupled into the NOLM $22_i$ and is split into two signals propagating in opposite directions, as indicated by the arrows, recombined at the coupler $21_i$ and reflected to the output of the coupler $21_i$. The output signal is fed to a filter $23_i$ the output of which is connected to the fiber $5_{i+1}$.

The NOLM modulates the soliton signal using a clock. As in the FIG. 1 device, this clock can be obtained by filtering some of said channels followed by clock recovery. As in FIG. 1, a coupler $10_i$ sampling part of the signal on the fiber at the amplifier output can be used; the sampled signal is fed to a filter $11_i$ which isolates one of the channels, for example the first channel. The signal from channel 1 filtered in this way is fed to means for recovering a clock $12_i$ which supply a clock signal at half the bit frequency and offset relative to the soliton signal of the first channel by an amount $\Delta_1$ at the output on a fiber $13_i$. The clock recovery device can be implemented in any manner known to the skilled person.

The clock signal from the fiber $13_i$ is coupled into the NOLM $22_i$ by a coupler $24_i$ in the direction indicated by the arrow $25_i$. The clock modulates the soliton signals of the various channels of the multiplex. For more information on the operation of an NOLM as a modulator reference may usefully be had to the article by S. Bigo et al, IEE Electronics Letters, vol. 31 No. 2, p. 2191–2193 or the article by S. Bigo et al, Optics Letters, vol. 21 No. 18, p. 1463–1465.

The filter $23_i$ at the output of the NOLM isolates the clock and passes the modulated soliton signals to the fiber $5_{i+1}$.

The clock can also be coupled into the NOLM at two symmetrical positions and in both propagation directions. For example, a coupler can be provided between the clock recovery means $12_i$ and the coupler $24_i$ having a coupling ratio of 50/50 and which separates the output signal from the means $12_i$ into first and second clocks. The first clock is coupled into the NOLM as in the FIG. 1 circuit and the second clock is coupled into the NOLM, after its phase is inverted, in a propagation direction opposite that of the first clock. To assure that the first and second clocks are in anti-phase, an appropriate difference between the fiber lengths or an optical delay line can be used, or the clock recovery means can be adapted to produce the two clocks directly. For more information on the operation of an NOLM in this configuration reference may usefully be had to the article by S. Bigo et al, Optics Letters, vol. 21 No. 18, p. 1463–1465.

Other configurations can be used, for example that described in a communication of D. Sandel et al, optical Fibers Communications 1994, FG2 p. 310; the NOLM input coupler is a 3/3 coupler, rather than a 2/2 coupler as in FIG. 4. The soliton signal to be modulated arrives at the middle input of the 3/3 coupler. The loop of the NOLM is connected to the first and third outputs of the coupler and the modulated signal is transmitted by the third input of the coupler. A circuit of this kind uses a clock at the soliton bit frequency.

In all cases the NOLM operates as a distributed optical modulator device and modulates the signals on the various channels of the multiplex. Slippage is not a problem because of the chosen temporal offsets between the clock and the various channels.

In the embodiments of the invention described with reference to FIGS. 1 through 4 the distributed optical modulation can cause non-uniform attenuation of the signals on the various channels of the multiplex; the signals on the channels for which the slippage is greater can be attenuated more than the signals on other channels. This should not generally constitute a problem. In any event, it is possible to overcome this lack of uniform attenuation by various means. Firstly, the transmission system can be provided with at least one filter having a transfer function that compensates the relative attenuation of the various channels. In this case a filter transfer function is chosen with a higher gain for the wavelengths of the channels on which the slippage is greater. A Bragg filter immediately after the modulator could be used for this, for example. In a configuration with an NOLM, the filter $23_i$ at the output of the NOLM, the function of which is to filter the clock, could also have its transfer function adapted accordingly.

It is also possible to provide narrowband filters in the transmission system to guide the soliton pulses and which compensate to some degree the non-uniform attenuation. Fabry Perot filters could be used, for example, which are well suited to wavelength-division multiplexing.

Optical modulation in accordance with the invention can also reduce the depth of modulation on the channels with the highest slippage. This is not a problem for the regeneration treatment.

Of course, the present invention is not limited to the examples and embodiments described and shown, but is open to many variants that will be apparent to the skilled person. Accordingly, it is clear that other distributed optical modulation systems than those described can be used, for example other NOLM circuits. The signal used for clock recovery could be sampled not only on the first channel but in fact on any channel or combination of channels. Finally, the wavelength allocation scheme is in no way limited to the examples described. Note also that filters and/or amplifiers can be added to or removed from the embodiments as described, as required. The invention is particularly advantageous in the configuration described with reference to FIG. 1, in that the transmission fiber itself is used to apply the modulation. Other clock recovery means could be used, for example a voltage-controlled local oscillator with a phase-locked loop, or any other means known in themselves.

There is claimed:

1. A wavelength-division multiplex fiber optic soliton signal transmission system in which the wavelengths of a plurality of multiplexed fiber optic signals transmitted on a plurality of channels are chosen to assure a relative slippage between the channels at a given interval, wherein said interval is substantially equal to a multiple of a bit time and, at at least one point of said transmission system, the soliton pulses of the various channels have a temporal offset relative to a given reference such that upon distributed optical modulation by a clock input at said point, for each channel, the extremum of a non-linear phase profile induced by said clock, integrated over the modulation length, coincides with a center of the bit time.

2. A transmission system as claimed in claim 1 wherein, for any wavelength $\lambda_i$ of said multiplex, the difference $\delta\tau_i$ between the slippage per unit length on the channel i and on the first channel satisfies the equation:

$$(k_i \cdot T - T/4) < \delta\tau_i \cdot Z_R < (k_i \cdot T + T/4)$$

where $k_i$ is an integer dependent on the channel and T is said bit time.

3. A transmission system as claimed in claim 1 including two distributed optical modulator devices along said transmission system and separated by a distance that is a multiple of said interval.

4. The transmission system claimed in claim 3 wherein said optical modulator device comprises:

means for filtering some of said signals, means for recovering a sinusoidal clock from the filtered signal, and means for coupling said clock into said fiber.

5. A transmission system as claimed in claim 4 wherein said temporal offset $\Delta_i$ for each channel i is given by the equation:

$$\Delta_i = \frac{-1}{2\pi B} \left\{ \arctan\left[\frac{\sin(2\pi B\tau_i)}{\cos(2\pi B\tau_i) - 1/\Gamma}\right] - \arctan\left[\frac{2\pi B\tau_i}{\mathrm{Ln}(\Gamma)}\right] \right\}$$

in which $\Gamma$ represents the total loss in the fiber over the length of said interval $Z_R$ and $\tau_i$ represents the relative slippage between said channel i and said clock over said interval $Z_R$ normalized by the bit rate B.

6. The transmission system claimed in claim 3 wherein said optical modulator device includes:
   means for filtering some of said channels,
   means for recovering a sinusoidal clock from the filtered signal,
   a non-linear optical loop mirror into which said soliton signals of said various channels pass, and
   means for coupling said clock into said non-linear optical loop mirror.

7. A transmission system as claimed in claim 4 wherein said temporal offset $\Delta_i$ for each channel i is given by the equation:

$$\Delta_i = \frac{-1}{\pi B}\left\{\arctan\left[\frac{\sin(\pi B\tau_i)}{\cos(\pi B\tau_i) - 1/\Gamma}\right] - \arctan\left[\frac{\pi B\tau_i}{\text{Ln}(\Gamma)}\right]\right\}$$

in which $\Gamma$ represents the total loss in the fiber of said mirror and $\tau_i$ represents the relative slippage between said channel i and said clock in said mirror normalized by said bit rate B.

8. A transmission system as claimed in claim 3 including at least one filter having a transfer function adapted to compensate relative attenuation of said channels caused by modulation in said optical modulator device.

9. The transmission system claimed in claim 8 wherein said filter is a Bragg filter.

10. The transmission systgem claimed in claim 6, including at least one filter having a transfer function adapted to compensate relative attenuation of said channels caused by modulation in said optical modulator device, wherein each filter is disposed at the output of a non-linear optical loop mirror and additionally separates said soliton signals and said clock.

11. A transmission system as claimed in claim 1 including at least one guiding filter.

12. A transmission method in a wavelength-division multiplex fiber optic soliton signal system wherein the wavelengths of a plurality of multiplexed fiber optic signals transmitted on a plurality of channels are chosen to assure a relative slippage between the channels at a given interval substantially equal to a multiple of the bit time, the soliton pulses of the various channels being transmitted so that at at least one point in said transmission system the soliton pulses have a temporal offset relative to a given reference such that upon distributed optical modulation by a clock input at said point, for each channel, the extremum of a non-linear phase profile induced by said clock, integrated over the modulation length, coincides with a center of the bit time.

13. A transmission method as claimed in claim 12 wherein for any wavelength $\lambda_i$ of said multiplex the difference $\delta\tau_i$ between the slippage per unit length on said channel i and on said first channel satisfies the equation:

$$(k_i T - T/4) < \delta\tau_i Z_R < (k_i T + T/4)$$

in which $k_i$ is an integer dependent on the channel.

14. A transmission method as claimed in claim 12 including at least one distributed optical modulation step executed at a distance from said point that is a multiple of said interval.

15. A transmission method as claimed in claim 14 wherein said optical modulation step includes distributed optical modulation in a non-linear optical loop mirror or in the transmission fiber by means of a sinusoidal clock.

16. A transmission method as claimed in claim 15 wherein said optical modulation step includes distributed optical modulation in the transmission fiber and the temporal offset $\Delta_i$ for each channel i is given by the equation:

$$\Delta_i = \frac{-1}{2\pi B}\left\{\arctan\left[\frac{\sin(2\pi B\tau_i)}{\cos(2\pi B\tau_i) - 1/\Gamma}\right] - \arctan\left[\frac{2\pi B\tau_i}{\text{Ln}(\Gamma)}\right]\right\}$$

in which $\Gamma$ represents the total loss in the fiber over the length of the interval $Z_R$ and $\tau_i$ represents the relative slippage between said channel i and the clock over the interval $Z_R$ normalized by the bit rate B.

17. A transmission method as claimed in claim 15 wherein said optical modulation step includes distributed optical modulation by a nonlinear optical loop mirror and said temporal offset $D_i$ for each channel i is given by the equation:

$$\Delta_i = \frac{-1}{\pi B}\left\{\arctan\left[\frac{\sin(\pi B\tau_i)}{\cos(\pi B\tau_i) - 1/\Gamma}\right] - \arctan\left[\frac{\pi B\tau_i}{\text{Ln}(\Gamma)}\right]\right\}$$

in which $\Gamma$ represents the total loss in the fiber of the mirror and $\tau_i$ represents the relative slippage between said channel i and said clock in said mirror normalized by the bit rate B.

18. A transmission method as claimed in claim 14 including at least one step of filtering the signal by a filter having a transfer function compensating relative attenuation of the channels caused by said modulation step.

* * * * *